Jan. 31, 1956    C. E. TULLER ET AL    2,733,326
MACHINE FOR MAKING CONTACT-CARRYING MEMBER
Filed June 5, 1951    4 Sheets-Sheet 3
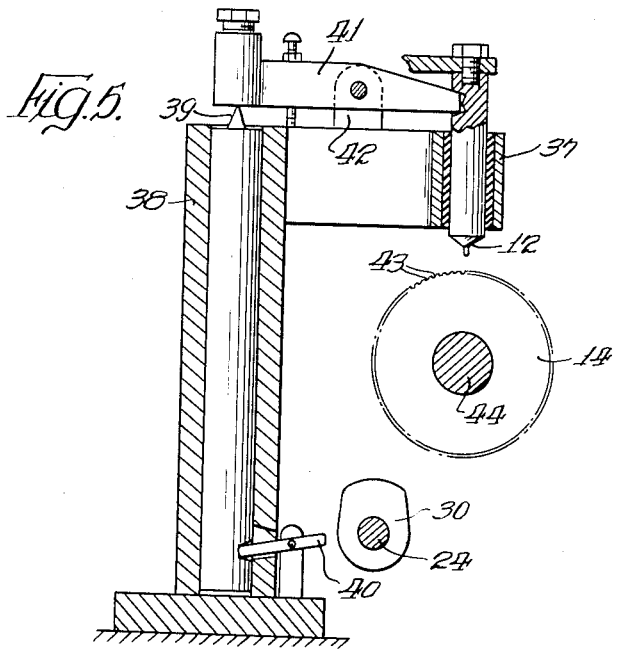
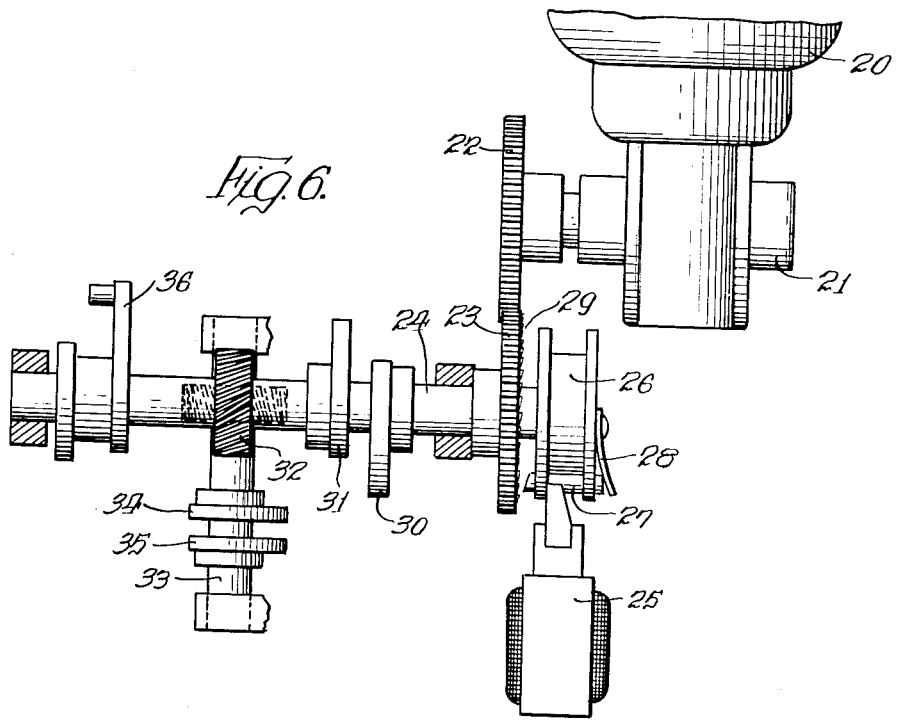
INVENTORS.
Clarence E. Tuller
BY Franklin J. Hickman
Brown, Jackson, Boettcher & Dienner.
Attys.

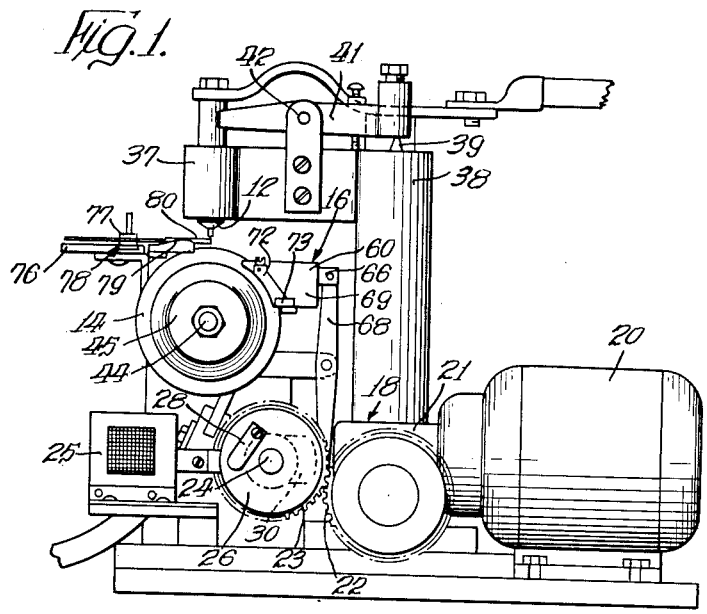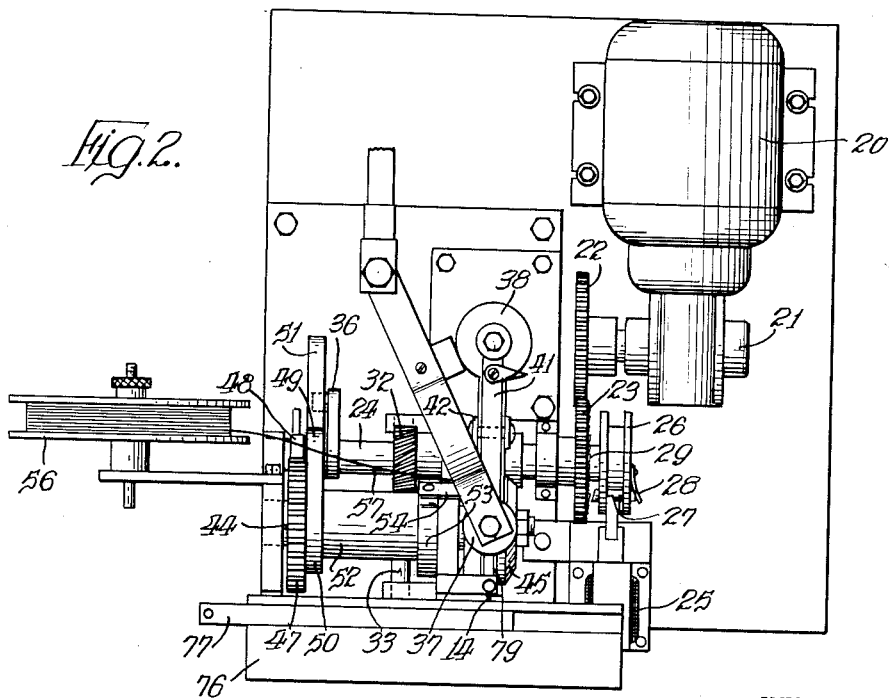

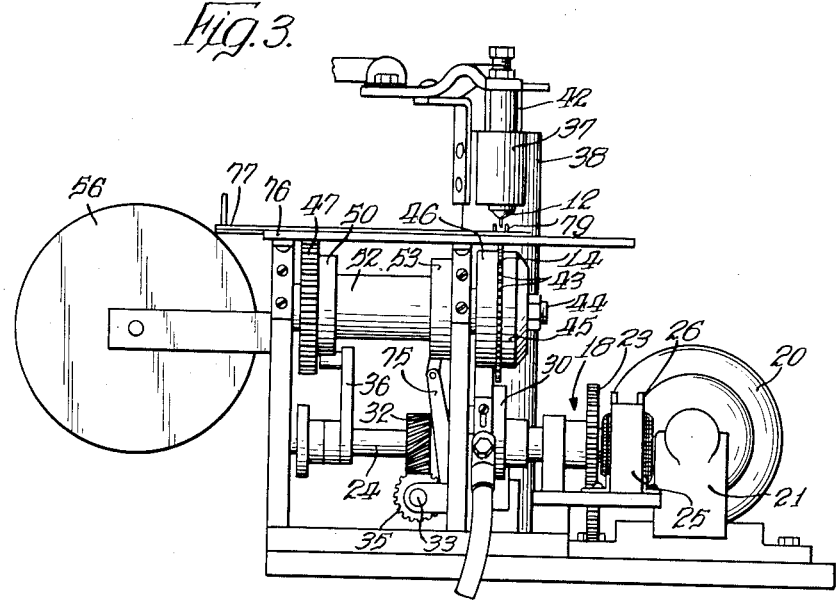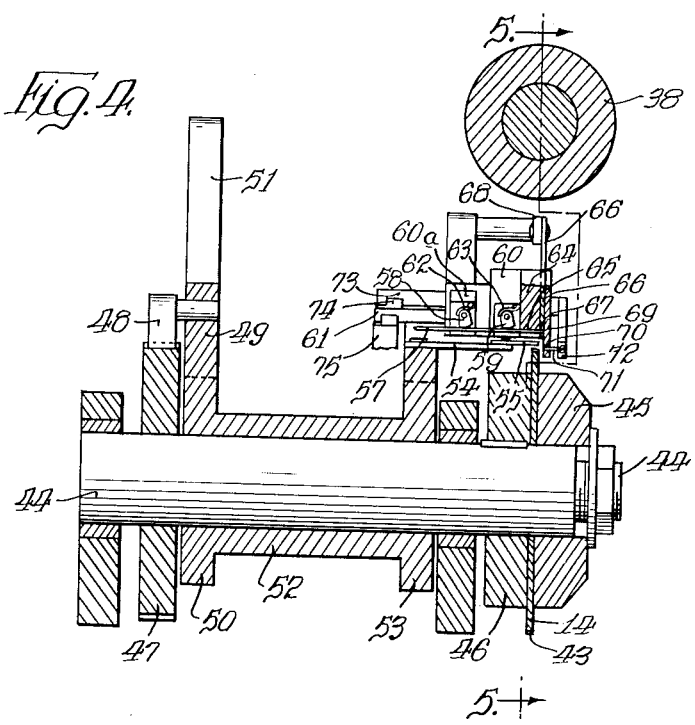

Jan. 31, 1956  C. E. TULLER ET AL  2,733,326
MACHINE FOR MAKING CONTACT-CARRYING MEMBER
Filed June 5, 1951  4 Sheets-Sheet 4

INVENTORS.
Clarence E. Tuller
BY Franklin J. Hickman
Brown, Jackson, Boettcher & Dienner.
Attys

United States Patent Office 2,733,326
Patented Jan. 31, 1956

2,733,326

MACHINE FOR MAKING CONTACT-CARRYING MEMBER

Clarence E. Tuller, Galion, Ohio, and Franklin J. Hickman, Fort Worth, Tex., assignors to North Electric Company, a corporation of Ohio Application June 5, 1951, Serial No. 229,906

7 Claims. (Cl. 219—4)

The present invention relates to a machine for making contact-carrying members, and particularly to a machine for automatically making contacts from wire members and welding such contacts to contact carriers.

In the telephony art and other electrical arts, the problem of manufacturing durable and positive conducting electrical contact members has led to the use of precious metals and precious metal alloys as contact material. Due to the cost of such metals, extreme care must be exercised in welding or otherwise securing the contacts to their carriers to prevent waste and loss of contact material. The present invention is particularly adapted, but not limited in use, for manufacturing contact-bearing members comprised of precious metal contacts contact members welded to contact carriers.

Metals to be utilized as contact material are readily and conveniently obtained in wire form and it is an object of the present invention to provide means for feeding wire to a point of use, cutting the wire to contact size, feeding the contact thus formed to a welding electrode and welding the contact to a contact carrier.

Another object of the invention is to provide a novel welding electrode comprising a rotatable disc having a plurality of pockets or recesses in its periphery, each pocket constituting an electrode and being adapted for the reception of a contact.

In prior welding machines, a single electrode or pair of electrodes has been utilized in immediately successive welding operations, with the result that the electrodes are heated to a high degree which leads to rapid deterioration of the electrodes. To prolong electrode life, various devices have been proposed for cooling the electrodes between successive operations. These devices have, for the most part, been entirely unsatisfactory, since they are not capable of instantly cooling the electrodes and/or subject the electrodes to such variations in temperature that the electrodes become rapidly deteriorated for reasons other than those originally sought to be prevented.

An object of the present invention is to provide a rotatable welding wheel for use in welding apparatus, the wheel being rotatable after each welding operation to bring a second, cool electrode into position for a single welding operation, whereupon the wheel is again rotated to bring a third electrode into position, etc. By utilizing the welding wheel in the present invention, each electrode is utilized for a single operation and then given the opportunity to cool slowly and naturally while other electrodes are being utilized. The use of a rotatable welding wheel also accomplishes the important object of reducing mechanical wear.

To accomplish the foregoing objects, the welding wheel of the present invention comprises a disc having a plurality of electrode cavities in its periphery. The disc may be rotated so as to bring each electrode into welding position in sequential order, but preferably, means are provided for automatically or semi-automatically moving the wheel a predetermined angular increment so that spaced electrodes are introduced one after another into welding position.

A further object of the invention is to provide a welding disc or wheel presenting a number of electrode cavities, the number of cavities having a direct relation to the incremental movement of the wheel so that all cavities are each utilized in a single welding operation before any one cavity is positioned for a second welding operation.

A still further object of the invention is to provide a welding disc or wheel having electrode cavities in its periphery, the total number of cavities constituting a multiple of the number defined in the preceding paragraph, whereby the cavities are capable of use in groups of the smaller number. The particular advantage of such arrangement is that should one or more cavities in a single group become worn, damaged, or otherwise incapable of effecting a perfect weld, the wheel or disc may be indexed to bring another group of cavities into use without requiring disassembly of the machine to replace the disc.

Another object of the invention is to provide indexing means for readily and easily varying the disposition of the welding wheel with respect to the means for moving same in angular increments.

The present invention also has as one of its objects, the provision of a novel method of feeding contact material to a welding position and the provision of apparatus for practising the method.

As previously described, precious metals are utilized frequently as contact material and it is an object of the present invention to provide a method and apparatus for feeding such metal and other contact material to a welding position without waste or loss of any of the metal.

Still another object of the invention is to provide welding apparatus of economical manufacture capable of effecting economical and efficient welding operations.

Other objects and advantages of the present invention will become apparent in the following detailed description of a preferred embodiment of the invention, wherein reference is made to the accompanying drawings, in which:

Figure 1 is an end view of the welding machine showing the electrode wheel;

Figure 2 is a plan view of the welding machine;

Figure 3 is a side view, in elevation, of the welding machine;

Figure 4 is a horizontal sectional view of the welding wheel shaft and the wire feeding mechanism;

Figure 5 is a diagrammatic, partial vertical sectional view, taken substantially along the line 5—5 of Figure 4;

Figure 6 is a diagrammatic layout of the drive mechanism;

Figure 7:
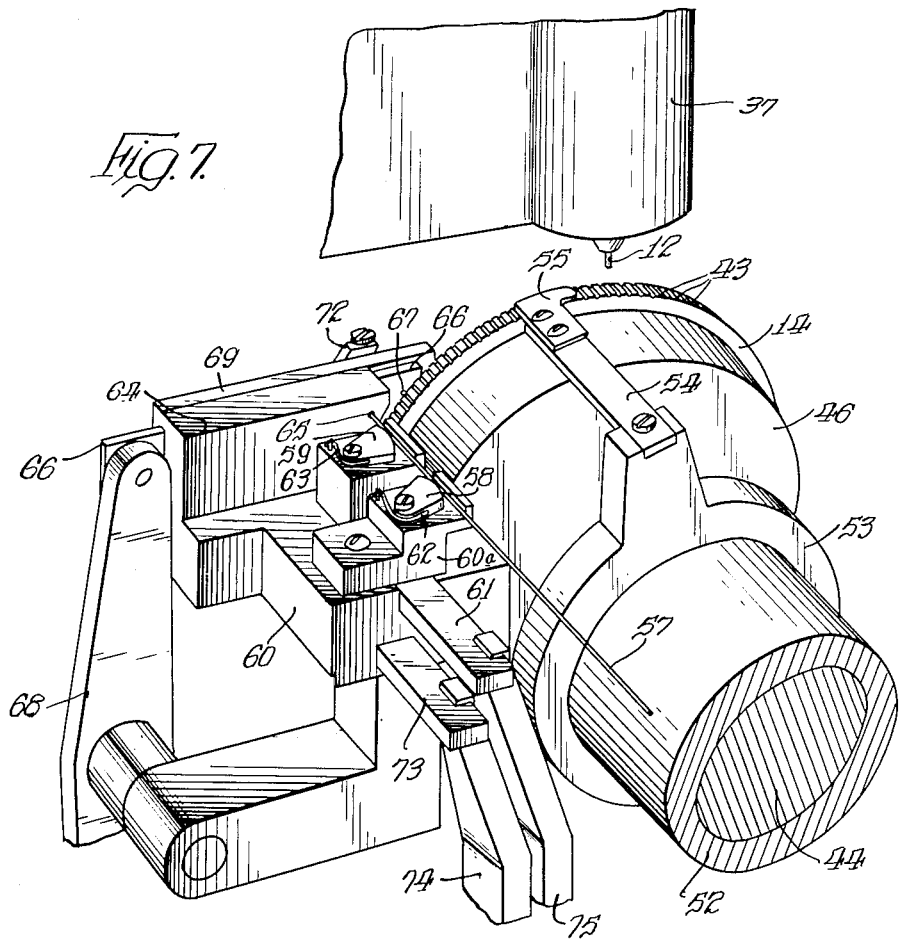
Figure 7 is a perspective view of the electrode wheel and the feeding mechanism.

Referring to the drawings, the welding machine comprises a vertically movable electrode 12, a rotatable electrode wheel 14, a feeding mechanism indicated generally at 16 and a drive mechanism 18.

As shown in Figure 6, the drive mechanism 18 comprises a motor 20, a gear reduction 21 and a drive gear 22 meshing with a driven gear 23. The driven gear 23 is rotatably mounted on a cam shaft 24. A solenoid 25, positioned adjacent the cam shaft 24, is provided with an armature having an inclined surface adapted to be received within a peripheral groove in a disc 26 secured to the cam shaft 24. A plug 27 is slidably mounted on the disc 26 and extends through the groove of the disc for engagement with the armature of the solenoid 25. A spring 28 secured to the side of the disc 24 engages one end of the plug 27 to normally urge the plug into engagement with a series of teeth 29 on the side of the driven gear 23. Energization of the solenoid 25 will effect attraction of its armature to release the plug 27 so that same is forced into engagement with the teeth 29 on the gear 23 by means of the spring 28 to effect driving connection between the driven gear 23 and the cam shaft 24. If the solenoid be momentarily energized and then released, the arrangement is such that one complete revolution of the cam shaft will occur before the plug 27 is engaged by the armature of the solenoid to disengage the driven gear 23 and the cam shaft 24.

A pair of cams 30 and 31 are secured to the cam shaft 24 for actuation, as will be described hereinafter, of the vertically movable electrode 12 and the feeding mechanism 16, respectively. To the rear of the cams 30 and 31, a gear 32 is secured to the cam shaft 24. A cross shaft 33, extending transversely of the shaft 24, has a gear secured thereto and in mesh with the gear 32 so that the cross shaft will be rotated upon rotation of the cam shaft 24. A pair of cams 34 and 35 are secured to the cross shaft 33 and are adapted to actuate the feeding mechanism 16 as will be described in detail hereinafter.

A cam or lever 36 is secured to the cam shaft 24 to the rear of the gear 32 for actuating another part of the feeding mechanism and for actuating the rotatable electrode 14.

As is shown somewhat diagrammatically in Figure 5, the vertically movable electrode 12 has a lead connected thereto and is reciprocal in a guide 37 which is secured to a hollow standard 38 positioned on the base of the machine. The electrode 12 is suitably insulated from the frame of the machine and from the guide, in a usual manner. A rod 39 is mounted within the hollow standard 38 for sliding movement and is operatively connected to a lever 40 which is pivotally mounted on the base of the machine. The free end of the lever 40 extends toward the cam 30 so as to be engaged by the cam to effect vertical movement in an upward direction of the rod 39. A lever 41 pivotally connected to a bracket 42 on the guide 37 is pivotally associated at one end with the electrode 12 and at its other end engages the top of the rod 39 for actuation thereby. The lever 41 is spring-loaded at the end thereof engaging the electrode 12 to normally hold that end of the lever 41 in an up position. It will be clear that upon actuation of the lever 40, the rod 39 will be raised to actuate the lever 41 to force or move the electrode 12 downwardly. Adjustable stop means may be provided on the lever 41 for varying the limits of movement of the electrode 12. Preferably, the end of lever 41 engaging the rod 39 is provided with a bore within which a spring is received to be compressed between the rod 39 and the lever 41 to maintain a spring bias and follow through tension on the electrode 12 during welding.

Figure 8:
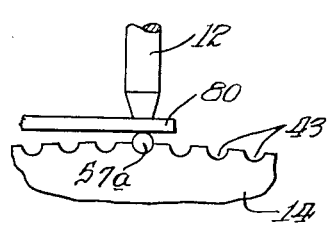
Figure 8 is a diagrammatic end view of the electrodes in welding position.
Figure 9:
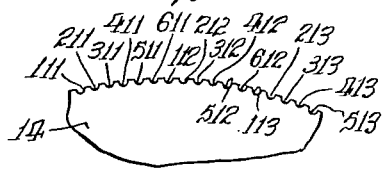
Figure 9 is a view, on an enlarged scale, of a portion of the electrode wheel.

Referring now to Figures 4, 8 and 9, the rotatable electrode wheel 14 comprises a disc having a plurality of valleys, indentations or recesses 43 in the periphery thereof, each of the recesses comprising an electrode. The disc 14 is mounted on a shaft 44 between a disc 45 and a collector wheel 46 and is held in fixed engagement with the disc 45 and the wheel 46 by means of a nut threaded on the end of the shaft 44. An electric lead or brush is mounted on the frame of the machine and extends into engagement with the collector wheel 46 to provide circuit connection to the electrode wheel 14. The wheel electrode is preferably connected to ground and, accordingly, is not insulated from the remainder of the machine. A toothed ratchet wheel 147 is secured to the other end of the shaft 44 and is engaged by pawl 48 which is pivoted to an arm 49 formed integrally with a ring or flange 50. The arm 49 on the ring or flange 50 is provided with an extension 51 extending toward and arranged to be actuated by the cam 36. The ring or flange 50 is formed integrally with a sleeve or collar 52 which surrounds and is rotatably mounted on the shaft 44. Upon each rotation of the cam shaft 24, the cam 36 is effective to lift the extension 51 and move the arm 49 and the sleeve 52 angularly. Due to the fact that the pawl 48 engages the wheel 47, the wheel 47 and the shaft 44 are moved simultaneously with the sleeve 52 to rotate the electrode 14 a predetermined angular increment of movement. As the cam or lever 36 moves away from the extension 51, the extension 51 and accordingly, the arm 49 and sleeve 52, follow the movement of the cam to accommodate a return angular movement of the sleeve 52 and members secured thereto. Spring means (not shown) are preferably provided for biasing the extension 51 toward the cam 36. The pawl 48 ratchets over the teeth of the wheel 47 so that the wheel 47, the shaft 44 and the electrode 14 remain in the position to which they were moved by actuation of the cam 36.

The sleeve 52 is provided at its forward end with a radial flange 53 and an arm 54 is suitably secured to the flange 53 by means of a screw or like fastening means. A resilient plate 55 is removably secured to the free end of the arm 54 and is so positioned as to overlie the periphery of the wheel 14 to partially close certain of the recesses 43 therein. In operation, as will be described in greater detail hereinafter, a contact is fed into one of the recesses in the welding wheel beneath the resilient retainer plate 55. Then, the cam 36 is effective to actuate the sleeve 52 to simultaneously move the electrode wheel 14 and the retainer plate 55 toward the vertically movable electrode 12. When the contact received in the recess of the electrode 14 is aligned with the electrode 12, it will be positioned at the top of the electrode wheel 14 and held in the recess by gravity alone. Thereafter, the retainer plate 55 is returned to its original position with the sleeve 52 as described hereinbefore. The retainer plate 55 serves to retain the contact in the groove or recess during rotation of the wheel 14, but is removable with respect to the contact and the wheel to allow the contact to remain in the recess in which it has been positioned so that the contact is aligned with the electrode 12.

A wire spool 56 is rotatably supported on the frame of the machine with the axis of the spool extending transversely of the shafts 24 and 44. A length of wire 57 is fed from the spool forwardly into engagement with a pair of friction clutches 58 and 59, which are supported by a fixed support 60. The clutch member 58 is rotatably mounted on a block 60a secured to the support 60 and serves as a brake for preventing movement of the wire in a direction toward the spool. The clutch member 59 is operatively associated with and connected to a drive bar 61 mounted for free sliding movement in the support 60 to effect oscillation of the clutch member 59. Due to the design of the face of the clutch member 59, oscillation thereof is effective to advance the wire engaged thereby forwardly, movement in the opposite direction being prevented by the brake 58 as described. Suitable springs 62 and 63 are provided for the clutch members 58 and 59, respectively, to retain them in operative association with the wire engaged thereby.

Suitably secured to, or formed integrally with the fixed support 60 is a guide plate 64 provided with a hole or aperture 65 adapted to receive the wire 57. A cutting blade or plate 66 is mounted in the support 60 for movement transversely of the hole or passageway 65 in the guide plate 64. The cutter 66 is provided with an aperture or hole 67 which is adapted to be normally aligned with the hole or passageway 65 in the plate 64. The cutting plate 66 is pivotally connected to a lever 68 which is pivotally mounted on the support 60 and has a free arm extending downwardly for association with and actuation by the cam 31. The lever 68 is adapted to move the cutting plate 66 transversely of the passageway 65 in the plate 64 so that the aperture 67 in the cutter 66 is moved from the passageway 65 in the plate 64 into alignment with one of the recesses 43 in the periphery of the electrode wheel 14. A pilot plate 69, formed integrally with the support 60, engages one side of the cutter 66 and is provided with a hole 70 aligned with one of the recesses 43 in the periphery of the wheel 14. The plate 69 is not provided with a hole or aperture in alignment with the passageway 65 in the guide plate 64. Therefore, wire will be fed through the passageway 65 and into the aperture 67 in the cutting plate 66 and the size of the piece or length of wire to be severed from the main body of the wire 57 will be determined by the width of the cutting plate 66 or by the depth of the hole 67 in the plate 66. An ejector pin 71 is slidably received within the hole 70 in the pilot plate 69 and is secured at its free end to a support 72 by means of a screw or suitable fastening means. The support 72 is suitably secured to an actuator bar 73 which is slidably mounted in the fixed support 60. The bars 61 and 73, as shown in Figure 7, have portions extending to the rear of the fixed support 60. Levers 74 and 75 are suitably secured to the frame of the machine for pivotal movement and at one end engage the rearwardly extending portions of the bars 73 and 61 and at the other end engage the cams 34 and 35, respectively, for actuation thereby to move the bars 73 and 61, respectively.

To the opposite side of the shaft 44, a work support 76 is suitably secured to the frame of the machine. A slide 77 is suitably secured to the support 76 for sliding movement with respect thereto by means of a cooperating dovetail construction indicated at 78. A work guide 79 is similarly secured to the frame of the machine and is provided with a groove aligned with the electrode wheel 14. In use, contact carriers are suitably mounted on the slide 77 for movement toward the work guide 79. The guide 79 is provided with inclined edge portions serving as a cam so that the contact carriers will be moved into the groove therein for proper alignment with the electrodes 12 and 14. In using the machine of the present invention, it is preferred that banks or sets of contact carriers, indicated at 80, be mounted on the side 77 at a single time for sequential alignment with the guide 79 and subjection to the welding operation.

In the operation of the welding machine of the present invention, the motor 20 is driven continuously and suitable switch means are provided for effecting intermittent or continuous energization of the solenoid 25 to intermittently or continuously connect the driving gear 22, the driven gear 23 and the cam shaft 24. Whether the machine be operated intermittently or continuously is dependent upon the skill of the operator. If the machine be operated intermittently, the cam shaft 24 will perform a complete revolution upon each energization of the solenoid 25 to perform a complete sequence of operation. Whether the machine be operated intermittently or continuously, the following sequence or order of movement will occur. Upon energization of the solenoid 25, the cam shaft 24 is rotated to effect rotation of the cross shaft 33 and the cam 35 carried by the cross shaft 33. The cam 35 engages the lever 75 to cause actuation of the clutch member 59 to feed wire 57 from the spool 56 into the hole 65 in the guide plate 64 and into the aperture 67 in the cutting plate 66, feeding of the wire into the aperture 67 being limited by engagement of the wire with the surface of the pilot plate 69. Thereafter, the cam 31 effects movement of the lever 68 to cause actuation of the cutting plate 66 to cut a piece or short length of wire, forming a contact 57a, from the main body of the wire 57 and to move the contact 57a into alignment with the periphery of the wheel 14. Then the cam 34 on the cross shaft 33 actuates the lever 74 to cause movement of the actuator bar 73 to move the ejector pin 71 into the aperture 67 in the cutting plate 66 to force the piece of wire, or contact 57a therein into one of the recesses 43 in the periphery of the wheel 14 beneath the retainer plate 55. The cam or lever 36 then engages the arm extension 51 on the sleeve 52 to oscillate the sleeve and to effect movement of the shaft 44 and the wheel 14 in an angular increment to bring the piece of wire in the recess in the periphery of the wheel 14 and the retainer plate 55 into alignment with the vertically movable electrode 12, the retainer plate after such movement being automatically returned to its original position leaving the piece of wire or contact 57a in alignment with the electrode 12. Then the cam 30 engages the lever 40 to effect downward movement of the electrode 12 into engagement with a contact carrier 80 to force that contact carrier into engagement with the piece of wire on the electrode 14, as is shown in Figure 8. The electrodes 12 and 14 are energized after the carrier 80 is moved into engagement with the contact 57a and therefore the piece of wire or contact 57a is electrically welded to the surface of the contact carrier 80. The electrodes are preferably energized automatically for a portion of the period of engagement of the contact and carrier under the control of a micro-switch (not shown) arranged to be actuated by the cam 36. The various levers engaging the cams are preferably biased into engagement with their respective cams by springs or the like. The levers may be secured to the particular elements to be actuated, thereby, or the the elements may be spring biased into engagement with the levers in a customary manner.

From the foregoing description of the operation of the welding machine of the present invention, it will be apparent that the cams must be so positioned on the respective shafts as to effect actuation of the various elements in the order enumerated. It will also be appreciated that certain of the cams must provide a time delay in order to facilitate or accommodate other movements of the machine. The cam 35 for effecting feeding of the wire 57 need not provide a time delay. The cam 31 for moving the wire cutter 66, however, must provide a time delay to retain the cutter in alignment with the periphery of the wheel 14 during operation of the ejector pin 71. The actuation of the ejector 71 may be effected rapidly and without any time delay by the cam 34. The cam 36 is only required to effect an angular increment of movement of the wheel 14 and the retainer plate 55 and therefore may be in the form of a lever arm projecting radially of the cam shaft 24. To provide for effective welding of the contact 57a to the contact carrier 80, the cam 30 is preferably designed to provide a time delay.

After the various described operations have been effected, the cam shaft 24 will have completed, or nearly completed, a complete revolution so that the plug 27 will be automatically moved out of engagement with the driven gear 23 to effect cessation of the rotation of the cam shaft 34 until the solenoid 25 is re-energized. If the solenoid is energized at the time the plug 27 again becomes aligned with the armature of the solenoid, the cam shaft 24 will continue to rotate to repeat the operations described.

Referring now particularly to the electrode wheel 14 and to Figures 8 and 9, the number of recesses 43 provided in the periphery of the wheel 14 may be varied within wide limits, but it is preferred in accordance with the present invention, that a particular arrangement be adhered to in the formtion of the wheel 14. To provide for adequate heat dissipation and to effectively utilize the feeding mechanism of the present invention, it will be appreciated that the wheel 14 must be moved in increments equal to the spacing between a number of the grooves in the periphery thereof. To accomplish this result and at the same time to effectively utilize the entire periphery of the wheel 14, the number of recesses in the periphery of the wheel must bear a direct relationship with the incremental movement of the wheel in response to actuation by the cam 36. The statement of this relationship is: the number of recesses in the periphery of the disc 14 is any number other than a multiple of the number of recesses in the space equal to the angular increment of movement imparted to the wheel 14 upon each actuation thereof. The statement is best explained by example. Assume, for example, that the wheel is to be moved in increments equalling the spacing between five recesses in the periphery of the wheel. If fifty recesses were to be provided in the periphery of the wheel, then the sequence of utilization of the recesses or electrodes would be 1–6–11–16– etc. –46–51, 51 being actually the number 1 electrode again. If fifty electrodes or any other multiple of five were utilized, only certain of the electrodes would be utilized and not all of them. By providing, say, forty-nine electrodes, the sequence or order of use of the electrodes would be 1–6–11–16– etc. –41–46–51, the fifty-first electrode being in actuality the number 2 electrode, so that upon the next complete rotation of the electrode wheel, the sequence of use would be 2–7–12–17– etc. –42–47–52, the fifty-second electrode being in actuality the third electrode. The sequence or order of use on the next revolution of the wheel then would be, 3–8–13– etc. and so on until all of the recesses in the periphery of the wheel had been utilized once each in a welding operation before repetition or second use of any one of the recesses. By calculation corresponding to the foregoing, it will be readily calculated that utilization of any number of electrodes other than a multiple of the number of electrodes falling or positioned within the angular space corresponding to each incremental movement of the wheel will result in utilization of each of the electrode recesses once in a single welding operation before repetition or second use of any one electrode for a second welding operation. Any number of recesses may be provided in the periphery of the wheel 14 and the incremental movement of the wheel 14 may equal the spacing between any number of recesses, so long as the particular relationship stated be adhered to.

In utilizing precious metals as contact material, it will be readily appreciated that a single failure to effect a perfect weld will result in substantial lack of economy in operation of the welding machine of the present invention. This is true even if only one electrode of the forty-nine, in the example given, prove to be faulty. Therefore, it is an object of the present invention to provide an electrode wheel having a plurality of groups of electrodes in the periphery thereof.

Referring to the example given in the preceding description, it is an object of the present invention to provide an electrode wheel 14, having in the peripheral surface thereof, a plurality of recesses, the total number of which is a multiple of the number of recesses defined by the relationship stated hereinbefore, or as in the particular example, a multiple of forty-nine recesses. When several groups of recesses are utilized, the incremental movement of the wheel is measured by the number of recesses of one group occurring within the space or distance travelled in an incremental movement of said wheel. By way of example, assume six multiples of the forty-nine recesses and an incremental movement of five recesses in one group. In actuality, the number of recesses occuring in the angular space equalling the angular increment of movement of the wheel will be thirty recesses. Therefore, the statement of relationship hereinbefore made actually holds true, since the total number of recesses in the periphery of the wheel is any number other than a multiple of the number or total number of the recesses lying in the angular space corresponding to the angular increment of movement of the wheel. The relationship, in constructions utilizing several groups of electrodes, can also be restated that the total number of recesses in the periphery of the wheel is equal to a multiple of the total number of recesses in each group, the total number of recesses in each group being any number other than a multiple of the number of recesses of said group falling within or being positioned within the angular space equal to the angular increment of movement of the wheel. By utilizing the group arrangement, the advantage is obtained that should any one electrode in any one group become faulty, the wheel 14 may be indexed with respect to the shaft carrying it so that a different group of electrodes may be brought into association with the feeding mechanism and the electrode 12.

Referring to Figure 9, a wheel is shown having in the periphery thereof several groups of electrode recesses. The first group of electrodes consists of the recesses 111, 112, 113, etc. The second group consists of the electrodes 211, 212, 213, etc. The third group of electrodes consists of the recesses 311, 312, 313, etc.; six such separate groups of electrodes being shown. Assuming six groups of electrodes, and forty-nine electrodes in each group, the wheel 14 would have a total of 294 recesses in its periphery. It is also to be assumed that the electrode wheel 14 is moved, upon each actuation thereof, an angular distance equal to the spacing between five recesses in one group, such as from 111 to 116. The total number of recesses lying between 111 and 116 is actually thirty and therefore it can be seen that the total number of recesses in the periphery of the wheel is not equal to a multiple of the total number of recesses lying within the space described. Likewise, it is appreciated that the number of forty-nine electrodes in each group is not a multiple of the number of electrodes in each group lying within the space described. In use, one set or group of electrodes are utilized until wear or damage thereto results in ineffective welding of at least one contact upon each utilization of all of the electrodes in that group. Upon the occurrence of such situation, the wheel 14 is indexed with respect to the shaft 44 by loosening the nut on the end of the shaft 44 to release the grip of the discs 45 and 46 on the wheel 14. The wheel 14 is then adjusted with respect to the shaft 44 to bring another group or set of recesses into alignment with the electrode 12. To properly index the wheel 14 with respect to the electrode 12, skill must be exercised to effect accurate alignment. It is preferred, therefore, that a skilled mechanic effect the indexing of the wheel 14 or that a jig be provided for effecting accurate alignment of the wheel 14 with the electrode 12. A readily available method for indexing the wheel is to align one recess of the group of recesses desired to be used with the hole 70 in the guide plate 69.

From the foregoing it will be appreciated that we have provided an electric welding machine capable of economically and efficiently feeding contact material to a contact carrier and economically and efficiently welding the contact to the carrier. The machine is operable with a minimum of effort and skill, the only movements required by the operator being the positioning of the contact carrier on the guide 79 and depressing a switch, or the like, momentarily to intermittently energize the solenoid, the machine thereafter performing all operations necessary to effectively weld the contact to the contact carrier. As the operator becomes more skilled in the operation of the machine, the machine may be operated continuously to increase the production output thereof. In normal operation of the machine, the only adjustment or operation requiring a skilled mechanic or laborer is the indexing of the electrode wheel 14 with respect to the electrode 12.

The welding machine has been described as including various cams, suitably driven and controlled by an electric motor and a solenoid clutch. It will be appreciated that the particular cam arrangement and drive arrangement may be varied and that mechanical drive and clutch means may be utilized equally as well. Such obvious variations are to be considered as full equivalents of the apparatus shown.

While we have described what we regard to be a preferred embodiment of our invention, it will be apparent that various changes, modifications and rearrangements may be made therein without departing from the scope of our invention, as defined by the appended claims.

We claim:

1. In a machine of the class described, a welding electrode comprising a disc mounted for rotation about its central axis, means for rotating said disc through angular increments of a predetermined value with each operation thereof, and electrode forming recesses on the periphery of said disc of a total number other than a multiple of the number of recesses in the space through which said disc moves in each angular increment of its movement.

2. In a machine of the class described, a welding electrode comprising a disc having a plurality of recesses in its periphery, and means for rotating said disc in angular increments equal to the spacing between a number of recesses in said disc, the total number of recesses in said disc being any number other than a multiple of the number of angular increments necessary to effect at least one full rotation of said disc and the number of recesses in the space equal to one angular increment of movement of said disc.

3. In a machine of the class described, a welding electrode comprising a disc having a plurality of recesses in its periphery, and means for rotating said disc in angular increments equal to the spacing between a number of recesses in said disc, the total number of recesses in said disc being one less than the multiple of the number of angular increments necessary to effect at least one full rotation of said disc and the number of recesses in the space equal to one angular increment of movement of said disc.

4. In a machine of the class described, a welding electrode comprising a disc having a plurality of electrodes at its periphery, and means for rotating said disc a distance equal to the spacing between a number of electrodes, the total number of electrodes on said disc being any number other than a multiple of the number of electrodes in the space equal to the distance of rotation of said disc.

5. In a machine of the class described, a welding electrode comprising a disc having a plurality of recesses in its periphery, and means for rotating said disc, said means having operative association with a certain group of said recesses, the recesses of said group being spaced recesses in said disc and said means being adapted to rotate said disc in angular increments equal to the spacing between a number of recesses in said group, the total number of recesses in said group being any number other than a multiple of the number of recesses in said group falling within the space equal to each angular increment of movement of said disc, and the total number of recesses in said disc being a multiple of the total number of recesses in said group.

6. In a machine of the class described, a welding electrode comprising a disc having a plurality of recesses in its periphery, and means for rotating said disc after each welding operation, said means having operative association with a certain group of said recesses, the recesses of said group being spaced recesses in said disc and said means being adapted to rotate said disc in angular increments equal to the spacing between a number of recesses in said group, the total number of recesses in said group being any number other than a multiple of the number of recesses in the space equal to each angular increment of movement of said disc, and the total number of recesses in said disc being a multiple of the total number of recesses in said group.

7. In a machine of the class described, a welding electrode comprising a disc having a plurality of recesses in its periphery, means for rotating said disc, said means having operative association with a certain group of said recesses, the recesses of said group being spaced recesses in said disc and said means being adapted to rotate said disc in angular increments equal to the spacing between a number of recesses in said group, the total number of recesses in said group being any number other than a multiple of the number of recesses in the space equal to each angular increment of movement of said disc, the total number of recesses in said disc being a multiple of the total number of recesses in said group whereby said disc presents a plurality of groups of recesses, and means for changing the operative association of said means from one group to another.

References Cited in the file of this patent

UNITED STATES PATENTS

| Number | Name | Date |
|---|---|---|
| 705,130 | Perry | July 22, 1902 |
| 746,442 | Bates | Dec. 8, 1903 |
| 980,874 | Latham | Jan. 3, 1911 |
| 1,851,785 | Taylor | Mar. 29, 1932 |
| 1,854,206 | Little | Apr. 19, 1932 |
| 1,910,882 | Caputo | May 23, 1933 |
| 1,975,155 | Keller | Oct. 2, 1934 |
| 1,994,701 | Hall | Mar. 19, 1935 |
| 2,075,121 | Lessman | Mar. 30, 1937 |
| 2,105,386 | Wilcox | Jan. 11, 1938 |
| 2,276,925 | Caputo | Mar. 17, 1942 |
| 2,384,485 | Norton | Sept. 11, 1945 |
| 2,417,819 | Gilliver | Mar. 25, 1947 |
| 2,465,390 | Mueller | Mar. 29, 1949 |
| 2,477,859 | Burge | Aug. 2, 1949 |
| 2,600,076 | Schelling | June 10, 1952 |
| 2,637,798 | Burge | May 5, 1953 |

FOREIGN PATENTS

| 589,148 | France | Feb. 17, 1925 |